Sept. 3, 1968   D. J. HARRIS   3,400,331
GAGING DEVICE INCLUDING A PROBE HAVING A PLURALITY OF
CONCENTRIC AND COEXTENSIVE ELECTRODES
Filed Jan. 18, 1965   2 Sheets-Sheet 1
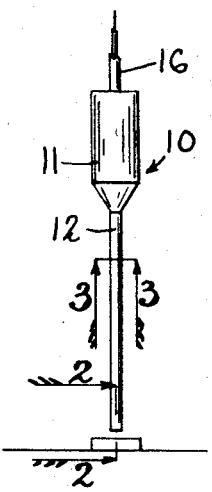
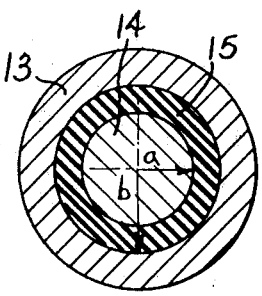
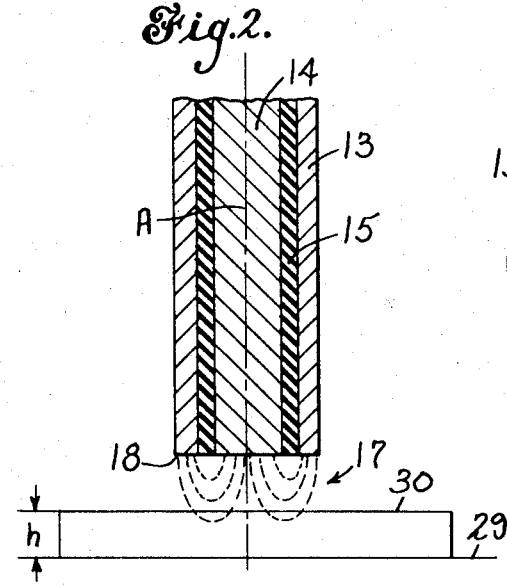
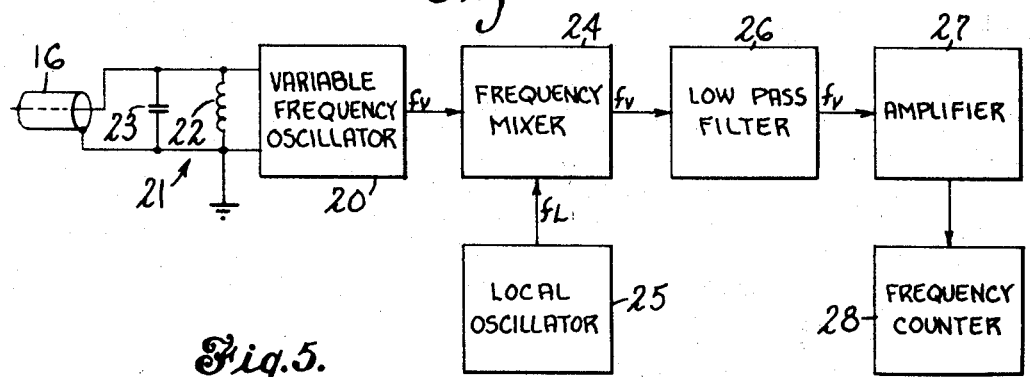
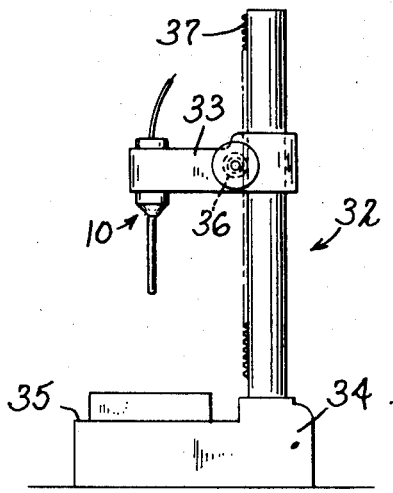
INVENTOR
Daniel J. Harris
BY
De Lio and Montgomery
ATTORNEYS

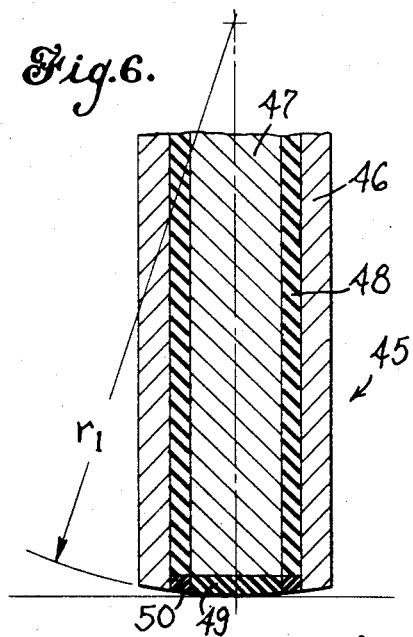
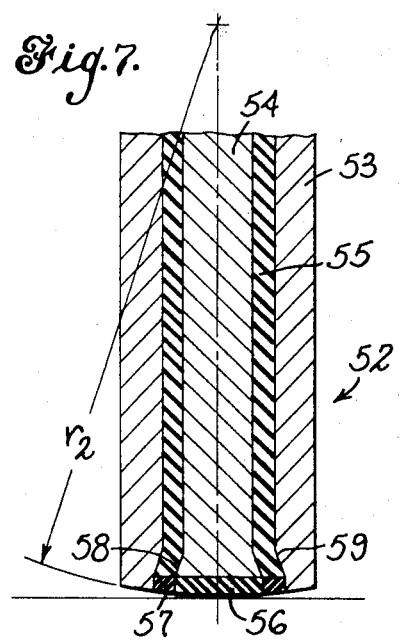
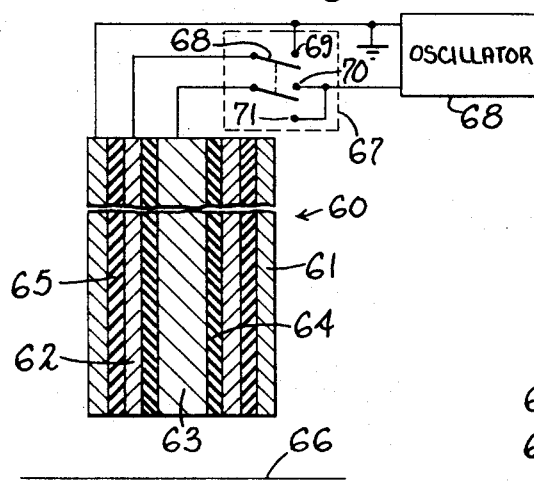
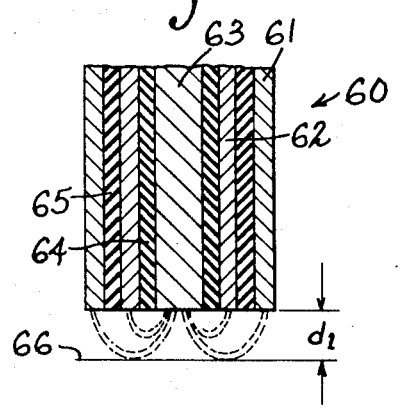
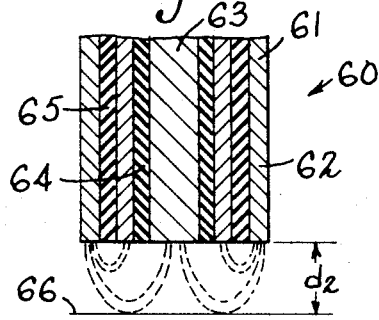
INVENTOR
Daniel J. Harris

United States Patent Office 3,400,331
Patented Sept. 3, 1968

3,400,331
GAGING DEVICE INCLUDING A PROBE HAVING A PLURALITY OF CONCENTRIC AND COEXTENSIVE ELECTRODES
Daniel J. Harris, West Hartford, Conn., assignor to Pratt & Whitney Inc., West Hartford, Conn.
Filed Jan. 18, 1965, Ser. No. 426,166
2 Claims. (Cl. 324—61)

ABSTRACT OF THE DISCLOSURE

A gaging device for measuring the dimensions of an object relative to a reference plane, including a gaging probe having coaxial capacitor electrodes adapted, when excited, to produce an electrostatic fringe field at one end thereof, means for applying a radio frequency signal across said electrodes to create the fringe field, a variable frequency oscillator having a frequency of oscillation dependent upon the value of capacitance between said electrodes so that when an object is inserted within the fringe field the capacitance between the electrodes is varied which changes the frequency of oscillation of said oscillator, means for detecting the frequency of oscillation of said oscillator, and means for displaying the detected frequency of the oscillator on readout means calibrated in dimensional units.

---

This invention relates to gaging and measuring devices, and more particularly relates to a capacitance gage for detecting the presence of an object, or measuring a dimension of an object relative to a reference plane.

The invention provides a new and improved gaging apparatus which establishes a fixed length of gap with or without contact, and which can very precisely and accurately measure small displacements and dynamically indicate small changes in displacement, and further can detect the proximity of material objects. A device embodying the invention is arranged to establish a very well defined electrostatic field, and sense the presence of an object in the electrostatic field. By controlling the size and shape of the electrostatic field, an object inserted therein may be very accurately gaged.

Briefly stated, the invention, in one form thereof, comprises a probe member having coaxial capacitor electrodes. The capacitor electrodes, which form part of the tank circuit of a variable frequency oscillator, produce an electrostatic "fringe" field at the ends thereof. This field has a geometry which is a function of the physical design of the probe unit and the exciting power. An object placed in this firing field will change the capacitance of the probe and vary the capacitance of the tank circuit. This results in a change in the frequency of the oscillator, which may be detected to indicate the distance between the tip of the probe and the object. The degree of disturbance of the fringe field can be used as a set point to establish a fixed gap.

Accordingly, an object of this invention is to provide a new and improved apparatus for detecting the proximity of an object from a reference plane.

Another object of this invention is to provide a new and improved capacitance gaging apparatus which establishes a small and confined electrostatic field for measuring and gaging purposes.

A further object of this invention is to provide a new and improved device of the type described having only a predetermined area of sensitivity, which is unaffected by undesired external objects.

A further object of this invention is to provide a new and improved device of the type described which is simple in construction and capable of a wide variety of applications.

A still further object of this invention is to provide a new and improved gaging system which utilizes an electrostatic field for gaging purposes, and which provides an easily interpretable signal indicative of a gaging function.

The novel features of the invention are set forth with particularity and distinctly claimed in the concluding portion of this specification. However, the invention, both as to organization and operation, together with further objects and advantages thereof may best be appreciated by reference to the following detailed description taken in conjunction with the drawings, in which:

FIG. 1 is a view in elevation of a gaging device embodying the invention;

FIG. 2 is an enlarged sectional view of the gaging device of FIG. 1 seen along line 2—2 of FIG. 1;

FIG. 3 is an enlarged cross-sectional view seen along line 3—3 of FIG. 1;

FIG. 4 is a diagram, in block form, of a circuit utilized in conjunction with the gaging device of FIGS. 1–3;

FIG. 5 is a view, in elevation, showing the device of FIG. 1 mounted on a gaging stand;

FIG. 6 is a view in longitudinal half-section of a gaging device embodying the invention which may be utilized for either contacting or non-contacting gaging functions;

FIG. 7 is a view in longitudinal half-section showing a device similar to that of FIG. 6, but of modified construction;

FIG. 8 is a view in longitudinal half-section of another embodiment of the invention which permits plural range gaging functions;

FIGS. 9 and 10 are views similar to FIG. 8 which are partly diagrammatic to aid in explanation of the operation of the device of FIG. 8.

A gaging unit embodying the invention is generally indicated by the reference numeral 10 and comprises a body member 11 of insulating material and a probe portion 12. As more clearly seen in FIG. 2 the probe portion 12 comprises an outer conductor 13 coaxial with an inner conductor 14 and separated therefrom by an insulator 15. The inner and outer conductors 14 and 13 are connected to the conductors of a coaxial cable 16 and, hence, to the tank circuit of a variable frequency oscillator as hereinafter described. When the conductors 13 and 14 are excited by a radio frequency signal, an electrostatic fringe field 17 is established at the end 18 of gaging unit 10. The ends of conductors 13 and 14 reside in a common plane. The size of the outer conductor 13, that is, the diameter and wall thickness, and also the diameter of the inner conductor 14, are chosen as a function of the size of the field that it is desired to produce at the probing end of the probe, as will hereinafter be discussed.

By way of example only, a gaging probe as thus far described has been constructed of a hypodermic needle and a jacketed wire. The insulating jacket on the wire had a slightly larger outside diameter than the inside diameter of the needle, and the jacket wire was drawn through the needle. The tip was ground flat so that the gaging end 18 of the probe resides in a plane which is perpendicular to the axis A of the probe. Of course, it will be understood that the probe may be constructed in varying sizes. In all sizes, however, the probe is so constructed that the diameter at the end 18 is substantially less than the length of the probe. This serves to concentrate the fringe field 17 in a small volume and thus help insure that the value of capacitance between conductor electrodes 13 and 14 is not affected by any undesired external influence.

It is well known to those skilled in the art that the capacitance of a pair of coaxial conductors is determined by the relative dimensions of the electrodes and properties of the dielectric, as for example, insulator 15, and is not affected by the materials used for the electrodes provided that the electrode materials are electrically conductive.

The capacitance between conductors 13 and 14 considered as a coaxial cable is $$C = \frac{55.5e}{\ln b/a} \text{ micromicrofarads per meter}$$

where
$a$ is the outer radius of the inner conductor in centimeters,
$b$ is the inner radius of the outer conductor in centimeters, and
$e$ is the dielectric constant of the medium between conductors, it being assumed that the dielectric medium is homogeneous.

With attention to FIG. 3 it may be seen that the distances $a$ and $b$ will be constant for a given probe and, also, the dielectric material 15 will be homogeneous throughout the length of conductors 13 and 14. The dielectric constant of the fringe field is air, where $e=1$. Now, if an object is brought into the fringe field 17, the overall dielectric constant determining the capacitance between conductors 13 and 14 will be varied, thus varying the capacitance between conductors 13 and 14.

A preferred means for detecting the change in capacitance of gaging unit 10 is shown in FIG. 4, and comprises a variable frequency oscillator 20 having a frequency of oscillation depending upon the inductance and capacitance in its tank circuit 21. As illustrated, tank circuit 21 is exemplified by an inductance 22 and a capacitance 23. The probe electrodes, conductors 13 and 14, are connected in parallel with capacitance 23 by means of the coaxial cable 16. The output of the variable frequency oscillator $f_v$ is applied to a frequency mixer 24 to which also receives as an input a fixed frequency $f_1$ from a local oscillator 25. In its preferred form, frequency mixer 24 is a pentagrid converter and the variable frequency oscillator, local oscillator and pentagrid converter comprise a well-known super-heterodyne circuit of the type commonly found in radio receivers. The result of the heterodyning of the frequencies in frequency mixer 24 produces four output frequencies, $f_v$, $f_1$, $f_1-f_v$ and $f_1+f_v$. These output frequencies of the frequency mixer applied to a low-pass filter 26 arranged to pass frequency $f_v$ to amplifier 27 which amplifies the output of the low-pass filter. The selected frequency is then applied to frequency counter 28 which is preferably of the type that shows a digital readout and gives a visual display of frequency $f_v$. The scale of counter 28 may be conveniently calibrated in dimensional units.

It will be understood that the frequency $f_v$ from variable frequency oscillator could be measured directly to determine the capacitance between conductors 13 and 14. However, the heterodyning arrangement disclosed is preferred inasmuch as it gives greater sensitivity.

As seen in FIG. 2, probe 10 may be positioned a predetermined distance above a reference plane indicated by the reference numeral 29 and be utilized to gage the height of objects represented by the numeral 30 above the plane of the reference surface. An object 30 moving into the electrostatic field 17 will change the overall dielectric constant of the medium between the conductors which, in effect, is changing the parameter $e$ in the foregoing equation. This results in a change in the value of the capacitance between conductors 13 and 14 and, hence, changes the product of the inductance and capacitance of tank circuit 21 and, thus, the frequency of oscillation of oscillator 20. The resulting frequency $f_v$ from oscillator 20 is then detected and the presence of object 30 is noted together with any deviation of height from a predetermined dimension. Dependent upon the material of the object to be gaged, the output frequency of system of FIG. 4 may be calibrated in terms of dimensional units for utilization purposes.

Additionally, it will be understood that the output of amplifier 27 could be applied to a discriminator which would furnish a unidirectional voltage output proportional in magnitude and polarity to the frequency $f_v$ or the deviation of frequency $f_v$ from a selected frequency of oscillator 20. The conductors 13 and 14 are excited from tank circuit 21 and the capacitance between the conductors actually forms a portion of the capacitance of tank circuit 21.

It will be apparent that the device described has many applications. Extensive tests have shown that with the probe described, it is possible to obtain a repeatability of plus or minus 0.000002 inch. This probe is extremely accurate and sensitive, and additionally can be utilized to provide a digital output which can inexpensively be integrated into a data processing system. For example, the disclosed apparatus may be utilized to establish a gap of fixed dimension without contact; to measure small displacements of an object; to indicate dynamically small changes in displacement of an object; or to detect the proximity of material objects. It is readily adaptable for mounting on a fixed or adjustable gaging stand.

As exemplified in FIG. 5 a probe 10 may be mounted on a gaging comparator type stand 32 having a movable probe holder 33 thereon which may be set a predetermined distance above a reference plane as indicated by member 34 having a gaging surface 35 thereon.

In FIG. 5, probe holder 33 is movable vertically by means of pinion 36 engaging rack 37. Suitable locking means may be included to position the end of probe 10 to a predetermined dimension above surface 35.

In other embodiments of the invention, exemplified in FIGS. 6 and 7, the probe may be arranged for contacting operation.

A probe 45, FIG. 6, has an outer conductor 46 and an inner conductor 47 coaxially arranged with an insulating medium 48 therebetween. The fringe field producing end is ground or otherwise formed on a spherical radius $r_1$. The inner conductor 47 and coaxial insulating medium 48 are recessed to receive therein an insulating button 49 and a washer-like non-conductive spacing member 50. The insulating button 49 and spacing member 50 also have their outer surfaces ground on the spherical radius $r_1$. With this construction, the probe unit can be used a contacting gage as well as a non-contacting gage.

The insulating button 49 and washer-like member 50 permits the use of the gage on electrically conducting materials to sense the location of the surface of the object. When the probe is used in such manner, the button 49 is brought into contact with the surface with extremely light pressure.

A second embodiment useful for contact gaging as well as non-contact gaging is shown in FIG. 7 and comprises a probe unit 52 having an outer conductor 53, an inner conductor 54 coaxial therewith, and an insulating medium 55 therebetween. The gaging tip of probe 52 is formed on a radius $r_2$ including an insulating button 56 and washer-like spacing member 57. The inner and outer conductors adjacent the gaging tip are formed with annular tapered shoulders 58 and 59 which provide a reactive surface against any contact pressure.

The forming of the gaging tips on the moderately large radii $r_1$ and $r_2$ permits satisfactory performance as a non-conducting capacity fixed gap tip as disclosed in conjunction with FIGS. 1–5, and additionally allows the probe units exemplified in FIGS. 6 and 7 to function as a contacting type gage or sensing device.

As shown by the foregoing expression for the capacitance for the probe, the capacitance is a function of the length of the probe. Increasing the length of the probe increases the total capacitance between its electrodes, and therefore decreases the sensitivity of the probe to changes in the effective capacity of the air gap between the gaging end and a reference plane. Therefore, in practice, the ratio of the length to the diameter of the probe would be determined by the type of material which would be inserted in the air gap for gaging purposes and the geometry thereof together with the resolution required in the proximity measurement.

In constructing a probe embodying the invention an important consideration is the ratio of the spacing between electrodes to the dimension of the air gap into which an object to be gaged is inserted. A large ratio implies that the capacitance of the gap to be measured is dominant and, therefore, the probe would have good sensitivity to change in gap distance. A large ratio also implies a low resolution of the surface from which proximity is gaged, therefore, yielding measurements which are not so localized as from a probe having a smaller ratio. In practice, the ratio will be selected as a compromise between sensitivity and resolution of measurement for a given application.

The gaging probe diameter should be kept as small as necessary to satisfy the resolution of measurement required for a given application. Also, the length of the probe should be kept as short as necessary to satisfy the requirement for sensitivity of measurement required for a given application.

The depth of the electrostatic fringe field extending from the gaging end of the probe varies with the diameter of the probe and the spacing between the concentric probe electrodes. The dimensions of coaxial electrodes of the probe will be selected in accordance with the foregoing parameters so as to provide a fringe field having a desired shape and concentration in the locality in which objects are to be gaged or measured.

FIG. 8 exemplifies another embodiment of the invention in the form of a probe 60 having coaxial electrodes 61, 62 and 63 and coaxial dielectric sleeves 64 and 65 therebetween. The probe 60 is particularly adapted for gaging at various distances from a reference plane P. The electrodes 61, 62 and 63 are connected through a range selective device 67. The range-selective device, which may take any suitable form, for simplicity of illustration is shown as a double-throw switch 68 which acts to commonly connect electrodes 61 and 62 to ground and the electrode 67 to the tank circuit of an oscillator 68; or commonly connect electrodes 62 and 63 to the tank circuit of oscillator 68 while electrode 61 is grounded.

FIG. 9 exemplifies the fringe field produced when electrodes 61 and 62 are both grounded, that is, the switch arms of switch 68 would be in contact with terminals 69 and 70. The electrostatic field then produced extends only to a depth $d_1$ below the plane of the gaging surface of the probe.

FIG. 10 exemplifies the action of probe 60 when electrodes 62 and 63 are made electrically common, as when the switch arms contact terminals 70 and 71. Under this condition of operation, the fringe field will extend a greater depth from the gaging surface of the probe as exemplified by the distance $d_2$.

It is thus apparent that the objects of the invention set forth, as well as those made apparent from the preceding description, are efficienly attained. The invention has been exemplified in preferred forms thereof; however, modifications to the disclosed embodiments of the invention as well as other embodiments thereof which do not depart from the spirit and scope of the invention may occur to those skilled in the art. Accordingly, the appended claims are intended to cover all embodiments which do not depart from the spirit and scope of the invention.

What is claimed is:

1. A gaging device for capacitively measuring the dimensions of an object comprising an oscillator having a tank circuit, said tank circuit having one end connected to ground, a probe including three concentric and coextensive capacitor electrodes separated by concentric and coextensive dielectric sleeves therebetween, one of said electrodes being connected to ground, and a switching means for selectively connecting the other electrodes across said tank circuit or to the other end of said tank circuit, whereby the depth of the electrostatic field produced for measuring purposes by said probe is controlled.

2. A gaging device for measuring the dimensions of an object relative to a reference plane, including a gaging probe having three concentric and coextensive electrodes separated by concentric and coextensive di-electric sleeves therebetween, one of said electrodes being grounded, means for applying a frequency signal across said electrodes to create a fringe field, a variable frequency oscillator for producing said frequency signal including a tank circuit having a frequency of oscillation dependent upon the value of capacitance between electrodes so that when an object is inserted within the fringe field the capacitance between the electrodes is varied which changes the frequency of oscillation of said oscillator, said tank circuit being grounded at one end, means for counting the frequency of oscillation of said oscillator, means for displaying the counted frequency of the oscillator on readout means calibrated in dimensional units, and a range-selective device for selectively connecting the other electrodes across said tank circuit or to the other end of said tank circuit.

References Cited

UNITED STATES PATENTS

| | | | |
|---|---|---|---|
| Re. 233,368 | 5/1951 | Grob et al. | 324—324 |
| 2,428,700 | 10/1947 | Eilenberger | 324—61 |
| 2,562,575 | 7/1951 | Raesler | 324—61 |
| 2,782,367 | 2/1957 | Dallas | 324—61 |
| 3,015,950 | 1/1962 | Doctor et al. | 324—61 XR |
| 3,039,052 | 6/1962 | Coffin et al. | 324—61 |
| 3,114,257 | 12/1963 | Foster et al. | 324—61 XR |
| 3,188,564 | 6/1965 | Felix | 324—61 |
| 3,217,144 | 11/1965 | Hinnah. | |
| 3,227,952 | 1/1966 | Proebster et al. | |
| 3,256,482 | 6/1966 | Rosso | 324—61 |
| 2,172,778 | 9/1939 | Taylor. | |
| 2,469,736 | 5/1949 | McBrayer | 324—61 |
| 3,046,479 | 7/1962 | Mead et al. | 324—61 |

FOREIGN PATENTS

| | | |
|---|---|---|
| 641,621 | 8/1962 | Canada. |

OTHER REFERENCES

German printed application No. 1,081,677, pub. May 12, 1960 (2 pp. spec., 1 sht. dwg.).

RUDOLPH V. ROLINEC, *Primary Examiner.*

E. E. KUBASIEWICZ, *Assistant Examiner.*